United States Patent [19]
Shekleton et al.

[11] Patent Number: 5,140,807
[45] Date of Patent: Aug. 25, 1992

[54] AIR BLAST TUBE IMPINGEMENT FUEL INJECTOR FOR A GAS TURBINE ENGINE

[75] Inventors: Jack R. Shekleton, San Diego; Michael W. Sledd, Vista, both of Calif.

[73] Assignee: Sundstrand Corporation, Rockford, Ill.

[21] Appl. No.: 649,478

[22] Filed: Feb. 1, 1991

Related U.S. Application Data

[63] Continuation-in-part of Ser. No. 283,080, Dec. 12, 1988, Pat. No. 4,989,404.

[51] Int. Cl.⁵ ............................ F23R 3/16; F23R 3/32
[52] U.S. Cl. ..................................... 60/39.36; 60/738; 60/743
[58] Field of Search ............... 60/39.36, 760, 759, 60/755, 738, 737, 740, 743; 431/403, 424; 239/432, 433, 418

[56] References Cited

U.S. PATENT DOCUMENTS

| | | | |
|---|---|---|---|
| 2,548,904 | 4/1951 | Neal et al. | |
| 2,706,520 | 4/1955 | Chandler | 60/739 |
| 2,835,110 | 5/1958 | Barberis | |
| 3,099,134 | 7/1963 | Calder et al. | 60/746 |
| 3,355,884 | 12/1967 | Poucher et al. | 60/743 |
| 3,531,937 | 10/1970 | Sneeden | 60/738 |
| 3,613,360 | 10/1971 | Howes | 60/39.36 |
| 4,216,652 | 8/1980 | Herman et al. | |
| 4,242,863 | 1/1981 | Bailey | |
| 4,549,402 | 10/1985 | Saintsbury et al. | 60/738 |
| 4,813,610 | 3/1989 | Renowden | |
| 4,815,665 | 3/1989 | Haruch | 239/432 |
| 4,827,888 | 5/1989 | Vaznaian et al. | 239/424 |
| 4,850,196 | 7/1989 | Scalzo et al. | 60/740 |

*Primary Examiner*—Richard A. Bertsch
*Assistant Examiner*—Timothy S. Thorpe
*Attorney, Agent, or Firm*—Wood, Phillips, VanSanten, Hoffman & Ertel

[57] ABSTRACT

Poor atomization of fuel at low fuel flows in a gas turbine engine may be overcome in an engine including a rotary compressor (14), a turbine wheel (22) coupled to the compressor (14) to drive the same and a nozzle of (26) for directing gases of combustion at the turbine wheel (22). An annular combustor (34) defines a combustion annulus about the turbine wheel (22) and has an outlet (30) connected to the nozzle (26). A plurality of air blast tubes (50) include exit openings (52) circumferentially spaced about the combustor (32) and each has an axis (54) that is generally circumferentially directed with respect to the combustion annulus. A fuel discharge orifice (64) is located within each air blast tube (50) and a flange (66) is aligned with each orifice (64) in the path of fuel being discharged therefrom and at a substantial acute angle ($\theta$) to the axis (54).

5 Claims, 1 Drawing Sheet

AIR BLAST TUBE IMPINGEMENT FUEL INJECTOR FOR A GAS TURBINE ENGINE

CROSS REFERENCE

This application is a continuation-in-part of the commonly assigned application of Jack R. Shekleton, U.S. patent application Ser. No. 283,080, filed Dec. 12, 1988 and entitled "Turbine Engine With High Efficiency Fuel Atomization" now U.S. Pat. No. 4,989,404.

FIELD OF THE INVENTION

This invention relates to gas turbine engines, and more particularly, to a low cost, high efficiency fuel atomizing fuel injector for a gas turbine engine.

BACKGROUND OF THE INVENTION

Gas turbine engines often include so-called "start injectors" that are used when initiating operation of the turbine. Start injectors operate on the principal of pressure atomization and as a consequence, in relatively small turbine engines in airborne environments whereat fuel flows at high altitudes during starting may be quite low, high pressures are required to achieve the pressure atomization required of a start injector. Air blast atomization is not a viable alternative during starts when the turbine is rotating at a minor percent of its rated speed. At the same time, at such low speeds, it is difficult with available fuel pumps to generate the necessary fuel pressure.

To meet these difficulties, conventional start injectors have extremely small orifices to provide the desired atomization making them precision formed parts. They are thus costly to manufacture and at the same time, because of the very small orifices employed, they are prone to plugging.

In the above-identified application of Shekleton, there is disclosed a unique fuel injector construction for a turbine engine that is of low cost construction and which may advantageously be employed both as a start injector and as a main fuel injector and which does not require high fuel pressures to achieve good atomization. The present invention is directed to improving upon the invention disclosed in the previously identified Shekleton application.

SUMMARY OF THE INVENTION

It is a principal object of the invention to provide a new and improved gas turbine engine. More specifically, it is the object of the invention to provide an improved, low cost, high efficiency fuel injector for a gas turbine engine.

An exemplary embodiment of the invention achieves the foregoing object in a gas turbine engine including a rotary compressor, a turbine wheel coupled to the compressor to drive the same, a nozzle for directing gases of combustion at the turbine wheel and an annular combustor defining a combustion annulus about the turbine wheel and having an outlet connected to the nozzle. A plurality of air blast tubes include exit openings circumferentially spaced about the combustor and each such air blast tube has an axis that is generally circumferentially directed with respect to the combustion annulus. A fuel discharge orifice is located within each air blast tube generally at the associated exit opening.

In a preferred embodiment, the flange is aligned with each of the orifices and is in the path of fuel being discharged therefrom, the flange also being generally at the associated exit opening.

In a highly preferred embodiment, the flange is at a substantial acute angle to the axis of the corresponding air blast tube.

In a preferred embodiment of the invention, the air blast tubes have sides and the fuel discharge orifices are inwardly of the sides and so proximate the exit openings that fuel exiting the orifices will not impinge upon such sides.

Preferably, the exit openings are generally planar and the fuel discharge tubes are cylindrical and have cylindrical axes. The fuel discharge orifices are located generally on the corresponding cylindrical axes and in the plane of the associated opening.

In a highly preferred embodiment, the air blast tubes have converging sides just upstream of the exit openings.

The invention contemplates that the air blast tubes be parts of castings having mounting sections opposite from the exit openings and provided with passages between the air blast tubes and the mounting sections. The passages are located exterior of the combustor and a plenum at least partially surrounds the combustor to encompass the passages and to be in fluid communication with the compressor. The mounting sections engage the plenum and fuel tubes extend through the mounting sections into the air blast tubes and terminate in a corresponding fuel discharge orifice.

Other objects and advantages will become apparent from the following specification taken in connection with the accompanying drawings.

DESCRIPTION OF THE PREFERRED EMBODIMENT

Figure 1:
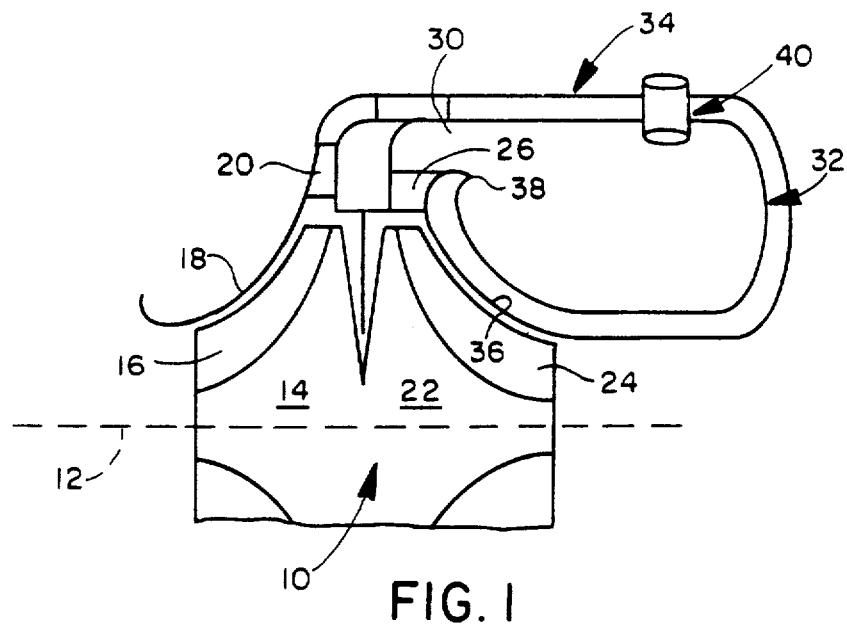
FIG. 1 is a somewhat schematic, fragmentary, sectional view of a gas turbine engine made according to the invention.

An exemplary embodiment of a gas turbine engine made according to the invention is illustrated in the drawings in the form of a radial turbine having a reverse flow combustor. However, it is to be understood the invention may be used advantageously with any type of turbine utilizing an annular combustor, whether or not reverse flow.

The engine includes a rotor, generally designated 10, mounted by means (not shown) for rotation about an axis 12. The rotor includes a centrifugal compressor 14 including compressor blades 16 rotatable in proximity to a fixed shroud 18 and discharging into a conventional diffuser having vanes 20.

The rotor 10 also includes a turbine wheel 22 including turbine blades 24. An annular nozzle 26 is located about the blades 24 to direct gases of combustion against the same to drive the turbine wheel 22 and thereby drive the compressor 14.

The nozzle 20 is in fluid communication with the exit end 30 of an annular combustor, generally designated 32, concentric with the axis 12. The combustor 32 is within a plenum, generally designated 34, which is connected to the diffuser 20 to receive compressed air therefrom. Certain of the compressed air is introduced into the combustor 32 to support the combustion of fuel therein to generate hot gases of combustion for application to the nozzle 26. In addition, some of the compressed air is utilized as dilution air as well as for cooling the combustor 32. Thus, the plenum 34 extends all the way about the combustor 32 to join to the rear turbine shroud 36 to direct compressed air to a discharge opening 38 just upstream of the nozzle 26 and within the combustor 32. Thus, the air discharging from the opening 38 serves as dilution air and prior to that, cools the combustor 32.

Figure 2:
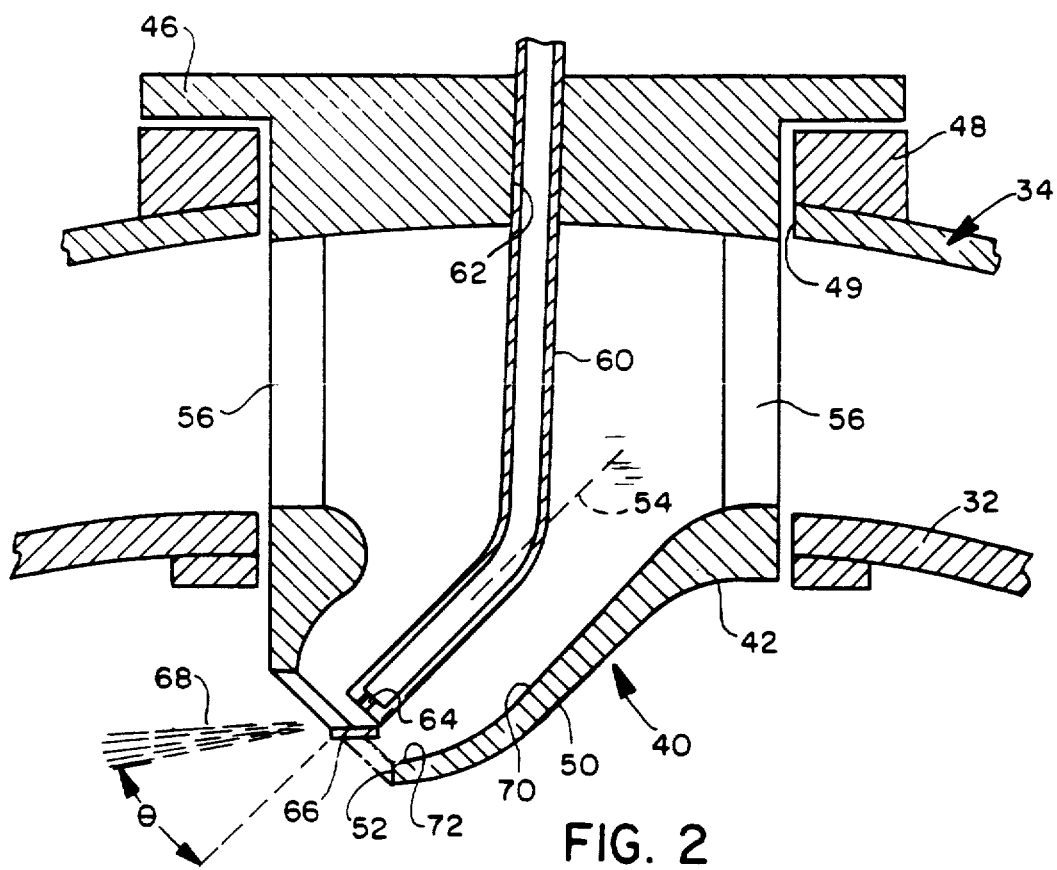
FIG. 2 is an enlarged, fragmentary, sectional view of one fuel injector made according to the invention and employed in the turbine engine.

At a plurality of circumferentially spaced locations about the annular combustor 32, the plenum 34 removably mounts fuel injectors, generally designated 40 (only one of which is shown). As best seen in FIG. 2, each of the fuel injectors 40 is made of a casting 42. At one end, the casting 42 includes a mounting bolt flange 46 which may abut and be sealed to a boss 48 surrounding an injector receiving opening 49 in the plenum 34.

At the opposite end of the casting 42, the same includes an air blast tube formation 50 including an exit opening 52. The air blast tubes 50 are somewhat cylindrical in terms of their internal configuration and thus have an axis 54 which is directed generally tangentially or circumferentially to the combustion annulus of the annular combustor 32.

It will be appreciated from FIG. 2 that the exit opening 52 of each air blast tube 50 is generally planar and in a plane that is at right angles to the axis 54.

Intermediate the mounting flange 46 and the air blast tube 50, each casting 42 includes opposed openings 56 which are located within the plenum 34 but exterior of the combustor 32. The openings 56 are, of course, in fluid communication with the air blast tubes 50 and thus provide a means whereby compressed air from the compressor 14 may be directed to the air blast tubes 50 and exit the corresponding exit openings 52 thereof into the combustor 32 in a generally tangential or circumferential direction.

A fuel injecting tube 60 is suitably mounted in a bore 62 in the casting 42 near the mounting flange 46 and extends through the casting 42 to terminate at a fuel discharge orifice 64 which is generally at the plane of the exit opening 52. A flange 66 is located on the tube 60 and is located so as to be in the path of fuel being discharged through the orifice 64 to provide impingement atomization of the fuel into a fine spray shown generally at 68. In a highly preferred embodiment, the flange 66 is also at an angle to the axis 54 of the air blast tube 50 and in the plane of the exit opening 52. Preferably, the angle is a substantial acute angle on the order of about 45°. The angle is illustrated as θ in FIG. 2.

In a highly preferred embodiment, the internal wall 70 of each air blast tube 50 is provided with a converging section 72 just upstream of the exit opening 52.

Significantly, locating the flange 66 and orifice 64 in the plane of the exit opening 52 or just upstream thereof avoids any fuel impingement on the interior of the air blast tube 50 which in turn could cause a deterioration in fuel atomization which is obviously undesirable. This in turn enhances atomization, apparently because the fuel is subject to the air blast for a longer period of time over a greater volume.

A number of advantages accrue from the foregoing. As can be readily appreciated, precision formation of the tube 60 and orifices 64 is not required and excellent atomization may be achieved by fuel emanating the orifice 64 impinging on the flange 66 without the need for high fuel pressures necessitated by pressure pumps. Furthermore, by angling the flange 66 with respect to the axis 54 of the air blast tubes 50, it will be appreciated that the spray will be attempting to move across the stream of air which will enhance atomization.

Additional enhancement of atomization is also achieved as a result of the converging section 72 for each air blast tube causing the air stream to converge upon the flange 66 while accelerating the velocity of the air stream as it emerges from the exit opening 52.

Thus, the invention provides a high efficiency, low cost fuel injection system as desired.

We claim:

1. A gas turbine engine comprising:
   a rotary compressor;
   a turbine wheel coupled to said compressor to drive the same;
   a nozzle for directing gases of combustion at said turbine wheel;
   an annular combustor defining a combustion annulus about said turbine wheel and having an outlet connected to said nozzle;
   a plurality of air blast tubes including exit openings circumferentially spaced about said combustor, each said air blast tube having an axis that is generally circumferentially directed with respect to said combustion annulus, each said tube having a converging interior section extending to said exit opening with each exit opening defining a plane;
   a fuel discharge orifice within each said blast tube for discharging a stream of fuel generally along said axis; and
   a flange aligned with and closely adjacent each said orifice and in the path of fuel being discharged therefrom at an acute angle to the axis of the associated air blast tube;
   said orifices and said flanges being in the planes of the exit opening of the associated air blast tube or just upstream thereof to avoid any fuel impingement on said interior section.

2. The gas tubine engine of claim 1 wherein said air blast tubes are parts of castings having mounting sections opposite from said exit openings and passages between said air blast tubes and said mounting sections and exterior of said combustor; a plenum at least partially surrounding said combustor to encompass said passages and in fluid communication with said compressor, said mounting sections engaging said plenum; and fuel tubes extending through said mounting sections and into said air blast tubes, each terminating in a corresponding fuel discharge orifice.

3. The gas turbine engine of claim 2 wherein said fuel discharge orifices and the corresponding flanges are located generally on the axis of the associated air blast tube.

4. The gas turbine of claim 3 wherein said acute angle is on the order of 40°.

5. The gas turbine engine of claim 4 wherein said orifices and said flanges are in the plane of the exit opening of the associated air blast tube.

* * * * *